United States Patent
Campbell

(10) Patent No.: US 9,390,342 B2
(45) Date of Patent: Jul. 12, 2016

(54) METHODS, SYSTEMS AND APPARATUS FOR CORRECTING PERSPECTIVE DISTORTION IN A DOCUMENT IMAGE

(75) Inventor: Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1125 days.

(21) Appl. No.: 13/275,256

(22) Filed: Oct. 17, 2011

(65) Prior Publication Data

US 2013/0094764 A1 Apr. 18, 2013

(51) Int. Cl.
*G06T 5/00* (2006.01)
*G06K 9/32* (2006.01)

(52) U.S. Cl.
CPC .. *G06K 9/32* (2013.01); *G06T 5/006* (2013.01)

(58) Field of Classification Search
CPC ................. G06T 7/0028; G06T 2207/10016; G06T 19/006; G06T 7/2033; G06T 5/006; G06K 9/3275; G06K 9/4671
USPC ........................................................ 382/154
See application file for complete search history.

(56) References Cited

U.S. PATENT DOCUMENTS

| | | | |
|---|---|---|---|
| 5,528,290 A | 6/1996 | Saund | |
| 5,581,637 A | 12/1996 | Cass et al. | |
| 6,304,313 B1 | 10/2001 | Honma | |
| 6,493,469 B1 | 12/2002 | Taylor et al. | |
| 6,721,465 B1 | 4/2004 | Nakashima et al. | |
| 7,079,265 B2 | 7/2006 | Horie | |
| 7,224,392 B2 | 5/2007 | Cahill et al. | |
| 7,593,595 B2 | 9/2009 | Heaney, Jr. et al. | |
| 2002/0075389 A1 | 6/2002 | Seeger et al. | |
| 2002/0149808 A1 | 10/2002 | Pilu | |
| 2007/0024714 A1 | 2/2007 | Kim et al. | |
| 2009/0185738 A1 | 7/2009 | Nepomniachtchi | |
| 2011/0069180 A1 | 3/2011 | Nijemcevic et al. | |

FOREIGN PATENT DOCUMENTS

| | | | |
|---|---|---|---|
| JP | 10-210354 A | 8/1998 | |
| JP | 10-210355 A | 8/1998 | |

(Continued)

OTHER PUBLICATIONS

Clark et al., Location and Recovery of Text on Oriented Surfaces [on-line], Jan. 22, 2000 [retrieved Nov. 12, 2014], Proc. SPIE 3967, Document Recognition and Retrieval VII, vol. 3967, pp. 267-277. Retrieved from the Internet: http://proceedings.spiedigitallibrary.org/proceeding.aspx?articleid=921212.*

(Continued)

*Primary Examiner* — Matthew Bella
*Assistant Examiner* — Dennis Rosario
(74) *Attorney, Agent, or Firm* — Law Office of Gerald Maliszewski; Gerald Maliszewski

(57) ABSTRACT

Aspects of the present invention are related to systems, methods and apparatus for correcting artifacts in a camera-captured document image and, in particular, to methods, systems and apparatus for correcting perspective distortion in the camera-captured document image. Multiple rectification hypothesis may be generated and verified based on a plurality of geometric rectification quality measure values. In particular, a first rectification hypothesis may be associated with a first bounding quadrilateral determined by estimation of horizontal and vertical vanishing information.

28 Claims, 9 Drawing Sheets

(56) References Cited

FOREIGN PATENT DOCUMENTS

| JP | 2000013612 A | 1/2000 |
|----|--------------|--------|
| JP | 2000-200344 A | 7/2000 |
| JP | 2007058634 A | 3/2007 |
| JP | 2010171976 A | 8/2010 |

OTHER PUBLICATIONS

Clark et al., Recognizing text in real scenes [on-line], Jul. 2002 [retrieved Aug. 10, 2015], International Journal on Document Analysis and Recognition, vol. 4, Iss 4, pp. 243-257. Retrieved from the Internet: http://link.springer.com/article/10.1007/s10032-001-0072-2.*

McLean, Geometric Correction of Digitized Art, Mar. 1996 [retrieved Mar. 2, 2016], Graphical Models and Image Processing, vol. 58, Issue 2, pp. 142-154. Retrieved from the Internet: http://www.sciencedirect.com/science/article/pii/S107731699690012X.*

Japanese Office Action, Patent Application No. 2012-219840, Mailing Date: Sep. 10, 2013.

* cited by examiner

METHODS, SYSTEMS AND APPARATUS FOR CORRECTING PERSPECTIVE DISTORTION IN A DOCUMENT IMAGE

FIELD OF THE INVENTION

Embodiments of the present invention relate generally to methods, systems and apparatus for correcting artifacts in a camera-captured document image and, in particular, to methods, systems and apparatus for correcting perspective distortion in the camera-captured document image.

BACKGROUND

Estimation of the planar pose of a camera-captured document image may be required to correct for a non-ideal camera position. Ideally, a camera's imaging plane should be parallel to the document plane in order to minimize geometric distortions introduced due to the perspective projection of the scene, onto the imaging plane, through the camera's optics. If the camera is tilted with respect to the document, the text characters, in the document, that are farther away from the camera may be shortened relative to the text characters that are closer to the camera. The non-uniformity of the text shapes may lower the accuracy of Optical Character Recognition (OCR) algorithms, and other document processing algorithms, and may not be preferred by human readers. Scene clutter may add noise and structure into detected patterns within the camera-captured document image making it difficult to obtain an accurate pose estimate. Additionally, unknown camera parameters may contribute to the difficulty of recovering an accurate pose estimate. Thus, methods, systems and apparatus for reliable pose estimation of a camera-captured document image may be desirable. Further, correction, using the pose estimate, of the distortion in the camera-captured document image may be desirable. The process of correcting an image for a non-ideal camera positioning may be referred to as geometric rectification.

SUMMARY

Some embodiments of the present invention comprise methods, systems and apparatus for correcting perspective distortion in a camera-captured document image.

According to a first aspect of the present invention, a bounding quadrilateral may be determined from horizontal vanishing information, vertical vanishing information and the results of corner detection. A plurality of geometric rectification quality measure values may be determined for a rectification hypothesis associated with the bounding quadrilateral. A rectification hypothesis for correcting the camera-captured document image may be selected from among the rectification hypothesis associated with the bounding quadrilateral and one, or more, additional rectification hypotheses.

According to a second aspect of the present invention, horizontal vanishing information may be estimated using horizontal line groups. Horizontal vanishing information may be a horizontal vanishing point or a horizontal vanishing direction.

According to a third aspect of the present invention, vertical vanishing information may be estimated using vertical line groups. Vertical vanishing information may be a vertical vanishing point or a vertical vanishing direction.

According to a fourth aspect of the present invention, corner detection may be used to bound a quadrilateral region-of-interest.

According to a fifth aspect of the present invention, selection of the rectification hypothesis for correcting the camera-captured document image may be performed hierarchically.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
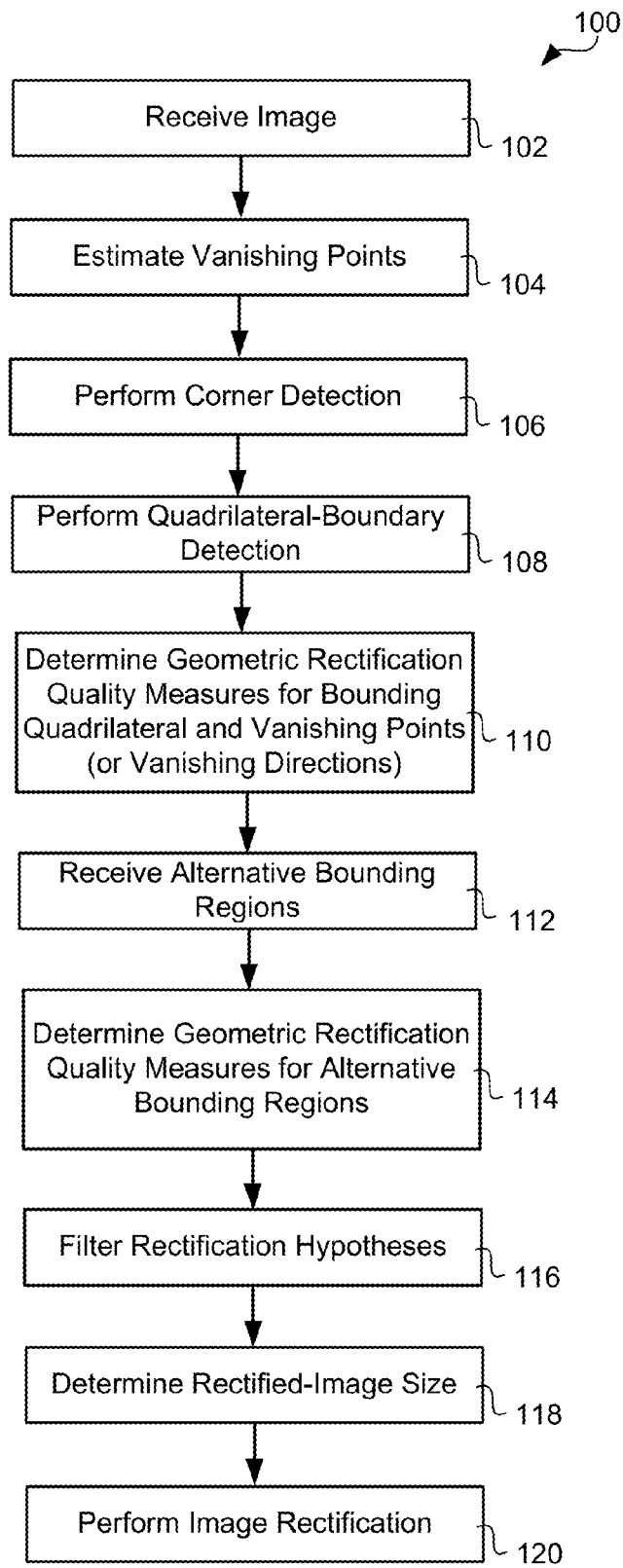
FIG. 1 is a chart showing exemplary embodiments of the present invention comprising image rectification, wherein a rectification hypothesis associated with a bounding quadrilateral identified through vanishing point, or vanishing direction, estimation is verified using geometric quality measures.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

Estimation of the planar pose of a camera-captured document image may be required to correct for a non-ideal camera position. Ideally, a camera's imaging plane should be parallel to the document plane in order to minimize geometric distortions introduced due to the perspective projection of the scene, onto the imaging plane, through the camera's optics. If the camera is tilted with respect to the document, the text characters, in the document, that are farther away from the camera may be shortened relative to the text characters that are closer to the camera. The non-uniformity of the text shapes may lower the accuracy of Optical Character Recognition (OCR) algorithms, and other document processing algorithms, and may not be preferred by human readers. Scene clutter may add noise and structure into detected patterns within the camera-captured document image making it difficult to obtain an accurate pose estimate. Additionally, unknown camera parameters may contribute to the difficulty of recovering an accurate pose estimate. Thus, methods, systems and apparatus for reliable pose estimation of a camera-captured document image may be desirable. Further, correction, using the pose estimate, of the distortion in the camera-captured document image may be desirable. The process of correcting an image for a non-ideal camera positioning may be referred to as geometric rectification.

Embodiments of the present invention comprise methods, systems and apparatus for rectifying a distorted, camera-captured document image.

Some embodiments of the present invention may be understood in relation to FIG. 1. FIG. 1 illustrates exemplary method(s) 100 of image rectification according to embodiments of the present invention. The order in which the method is described is not intended to be construed as a limitation, and any number of the described method blocks may be combined in any order to implement the method, or an alternative method.

An image may be received 102 in a processor module. The received image may comprise a plurality of pixels, wherein each pixel may comprise an associated value, or values. Vanishing points, in the received image, may be estimated 104 using the received image.

Figure 2:
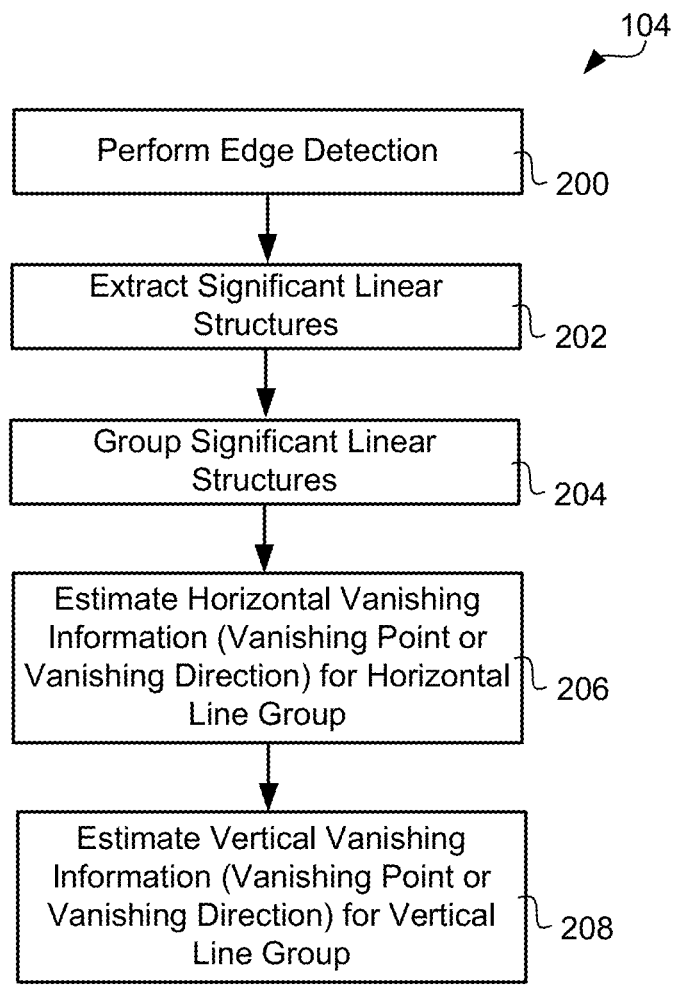
FIG. 2 is a chart showing exemplary embodiments of the present invention comprising vanishing point estimation using a horizontal line group and a vertical line group.

Vanishing-point estimation 104 may be understood in relation to FIG. 2. FIG. 2 illustrates exemplary method(s) 104 of vanishing-point estimation according to embodiments of the present invention. The order in which the method is described is not intended to be construed as a limitation, and any number of the described method blocks may be combined in any order to implement the method, or an alternative method.

In some embodiments of the present invention, a contour edge-detection method, for example, the Canny edge detector and other contour edge detectors that may complete linear structures through weak contrast areas, may be used to perform edge detection 200 on the received image, resulting in an edge mask. In alternative embodiments of the present invention, a gradient-based edge-detection method, for example a Sobel edge detector, a Laplace edge detector, a Scharr edge detector and other gradient-based edge detectors, may be used to perform edge detection 200 on the received image.

From the results of the edge detection, significant linear structures may be extracted 202. Significant linear structures may result, for example, from document boundaries, interior region boundaries, graphic frames, image frames, text lines and paragraph formatting. In some embodiments of the present invention, extracting significant linear structures 202 may comprise applying, to the edge mask generated from performing edge detection, a Hough transform with line linking. In some embodiments, fragmented line segments with a separation less than a separation threshold may be linked. In some embodiments of the present invention, line segments with a line length less than a length threshold may be rejected. In some embodiments of the present invention, an occupancy measure, which may be denoted $L_{fragmentation}$, for a linear structure may be defined as the ratio of the sum total length of the line gaps to the length of the line and may be determined according to:

$$L_{fragmentation} = \frac{\text{length of line gaps}}{\text{length of line}}.$$

In some embodiments, the linear structure may be accepted as a significant linear structure when the occupancy measure, $L_{fragmentation}$, meets an occupancy criterion relative to an occupancy threshold, which may be denoted $T_{fragmentation}$, and the length, which may be denoted $L_{length}$, of the linear structure meets a length criterion relative to a length threshold, which may be denoted $T_{length}$, for example, if:

$$L_{fragmentation} < T_{fragmentation} \text{ and } L_{length} \geq T_{length}.$$

Exemplary threshold values are $T_{fragmentation}=0.3$ and $T_{length}=25$. Alternatively, the number of gaps, which may be denoted $L_{numgaps}$, in a linear structure may be defined as the number of line gaps in the linear structure, and a linear structure may be rejected as a significant linear structure when the number of line gaps meets a gap-count criterion relative to a gap-count threshold, which may be denoted $T_{numgaps}$, for example, when $L_{numgaps} > T_{numgaps}$. In an exemplary embodiment, $T_{numgaps}=3$.

In some embodiments of the present invention, line fragmentation may be measured for each significant linear structure, and linear structures with significant fragmentation may be rejected as unreliable estimators for the vanishing points. In an exemplary embodiment, line fragmentation may be measured by applying a distance transform to the edge mask. In some embodiments, the value of the distance-transformed edge mask at a pixel may be the distance, according to a distance metric, to the nearest edge pixel. The measure of the fragmentation of a detected line may be the sum of the intersection of the line with the distance-transformed edge mask. The value of a fragmentation measure will be larger for fragmented structures than for solid, connected lines.

Significant linear structures may be grouped 204 into a horizontal line set, also considered a horizontal line group, and a vertical line set, also considered a vertical line group. The horizontal line group may include all of the significant linear structures that converge to a horizontal vanishing point, if such a point exists. The vertical line group may include all of the significant linear structures that converge to a vertical vanishing point, if such a point exists.

The horizontal line group, which may be denoted $L_H$, may be the set consisting of all significant linear structures, $L_i$, from the set of significant linear structures, $L_{sig}$, such that $|\vec{n_i} \cdot \vec{v}| \leq |\vec{n_i} \cdot \vec{h}|$, where $\cdot$ denotes the vector dot product, $|\cdot|$ denotes the absolute value operator, $\vec{n_i}$ denotes the normal of $L_i$ and $\vec{v}$ and $\vec{h}$ denote the nominal horizontal, $$\vec{h} = \begin{pmatrix} 0 \\ 1 \end{pmatrix},$$

and nominal vertical, $$\vec{v} = \begin{pmatrix} 1 \\ 0 \end{pmatrix},$$

line normal directions, respectively. This may be denoted:

$$L_H = \{L_i \in L_{sig} : |\vec{n_i} \cdot \vec{v}| \leq |\vec{n_i} \cdot \vec{h}|\}.$$

The vertical line group, which may be denoted $L_V$, may be the set consisting of all significant linear structures, $L_i$, from the set of significant linear structures, $L_{sig}$, such that $|\vec{n_i} \cdot \vec{v}| > |\vec{n_i} \cdot \vec{h}|$. This may be denoted $L_V = \{L_i \in L_{sig} : |\vec{n_i} \cdot \vec{v}| > |\vec{n_i} \cdot \vec{h}|\}$ The line groups, $L_H$ and $L_V$, may be used to estimate 206 horizontal vanishing information, either a horizontal vanishing point or a horizontal vanishing direction, and to estimate 208 vertical vanishing information, either a vertical vanishing point or a vertical vanishing direction, respectively. In a document imaged under an oblique angle, parallel lines, under perspective projection, will converge to a vanishing point. Due to optical distortion and limitations in line estimation procedures, parallel lines may not always converge to a single point, and, in some cases, a degenerate condition may exist. In some embodiments of the present invention, the horizontal vanishing point, or horizontal vanishing direction, may be estimated first and then the vertical vanishing point, or vertical vanishing direction, may be estimated.

Figure 3A:
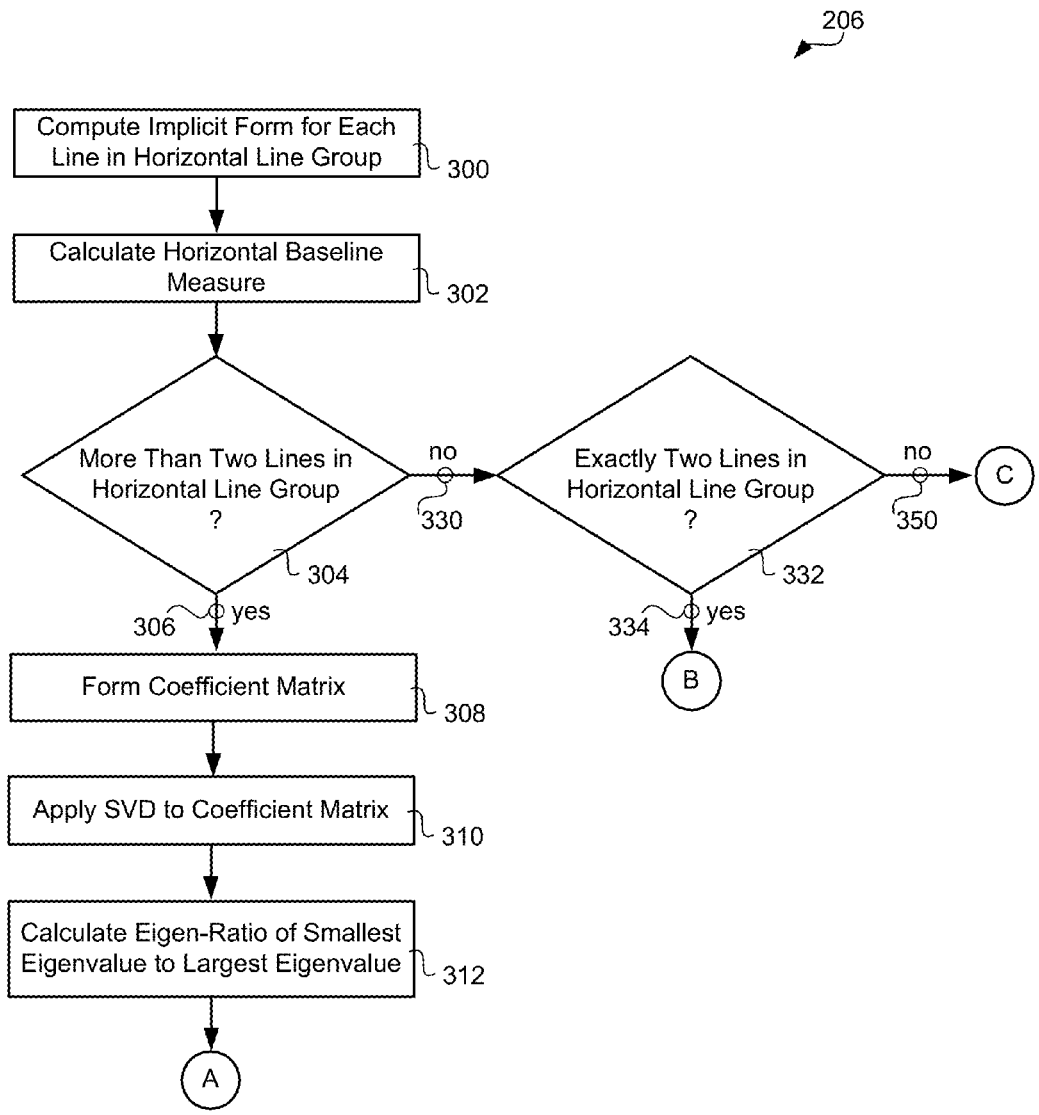
FIGS. 3A-3C are a chart showing exemplary embodiments of the present invention comprising estimation of horizontal vanishing information using a horizontal line group.
Figure 3B:
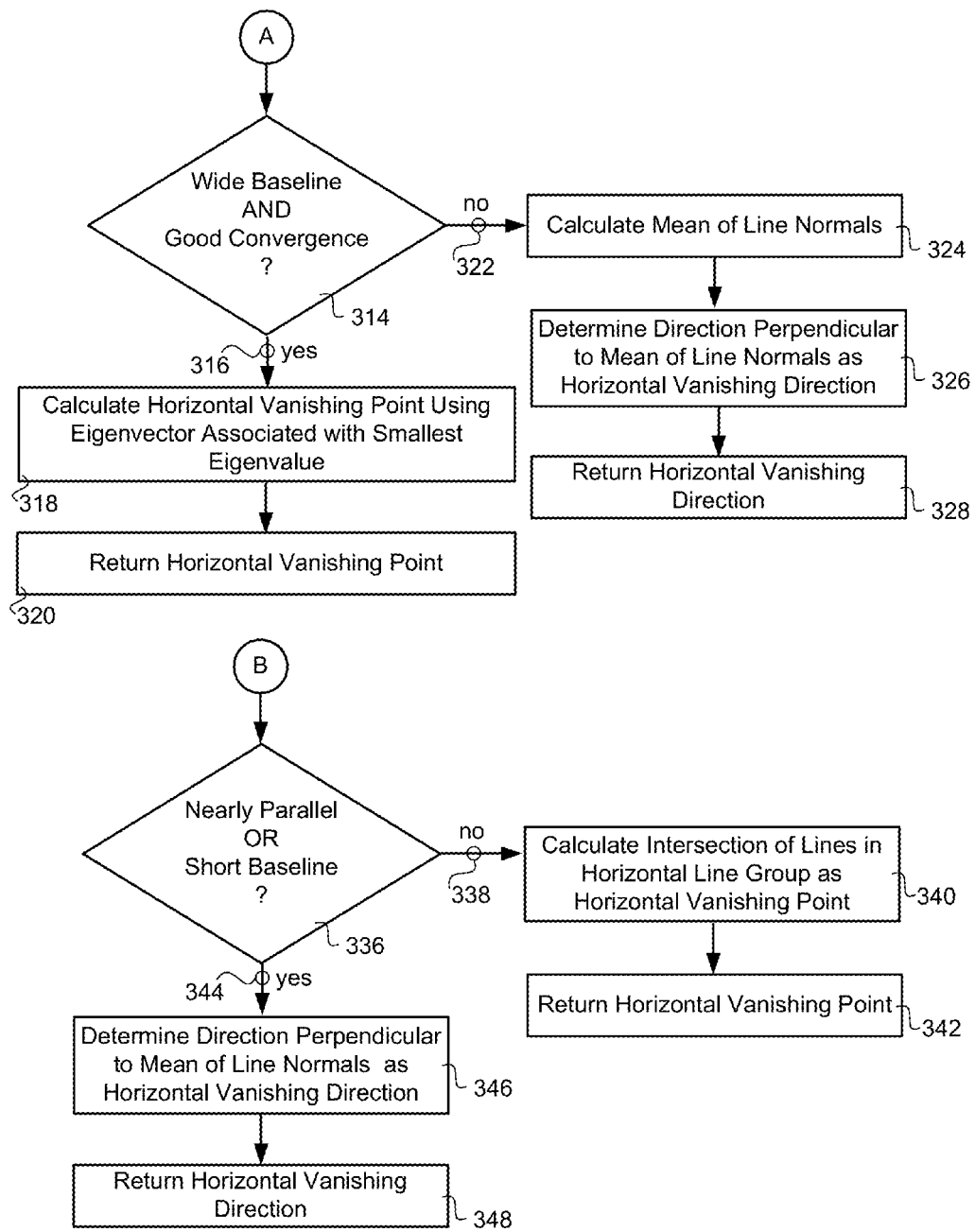
Figure 3C:
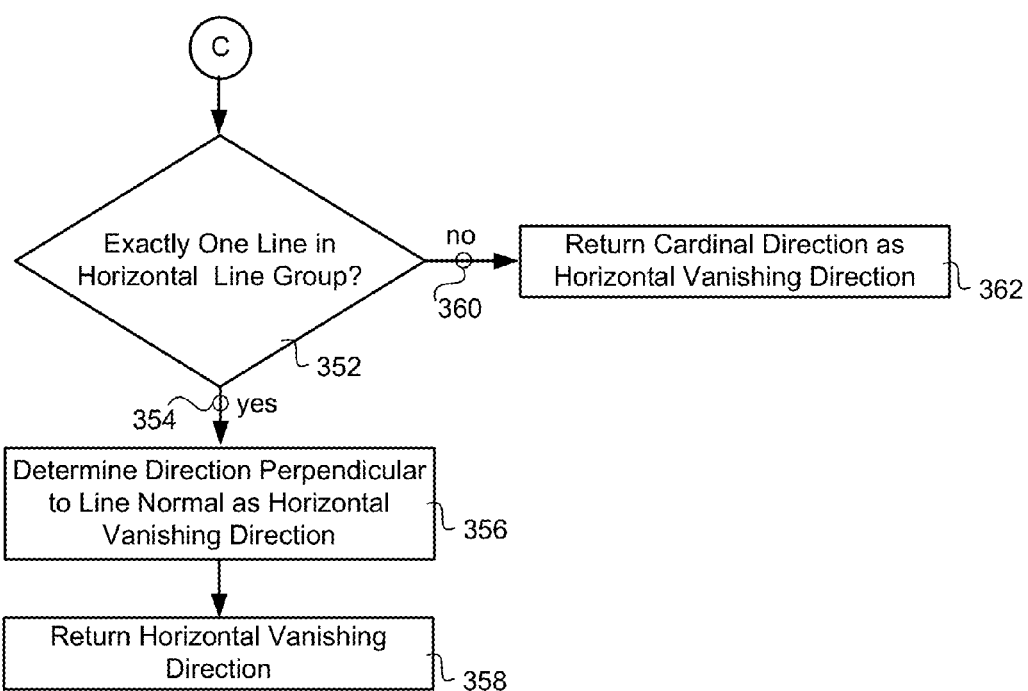

Vanishing-point estimation for a horizontal line group may be understood in relation to FIG. 3. FIG. 3 illustrates exemplary method(s) 206 of horizontal-vanishing-point estimation, using a horizontal line group, according to embodiments of the present invention. The order in which the method is described is not intended to be construed as a limitation, and any number of the described method blocks may be combined in any order to implement the method, or an alternative method.

For each line in a horizontal line group, $L_H$, the implicit form, $ax+by+c=0$, of the line may be computed 300. A horizontal baseline measure may be calculated 302 for the horizontal line group. The horizontal baseline measure, which may be denoted $baseline_H$, corresponding to the horizontal line group, $L_H$, may be defined according to:

$$baseline_H = \left\{ \begin{array}{c} \max_{i,j,i \neq j} (d_{i,j}) : d_{i,j} = \|(L_i \cap V) - (L_j \cap V)\|, \\ \{L_i, L_j\} \in L_H \end{array} \right\}$$

where $d_{i,j}$ denotes the distance between the intersection of a first line, $L_i$, in the horizontal line group, and a vertical line, $V$, passing through the center of the image, and the intersection of a second line, $L_j$, in the horizontal line group, and the vertical line, $V$, passing through the center of the image.

The number of lines in the horizontal line group, may be examined 304, and if there are 306 more than two lines in the horizontal line group, a coefficient matrix, which may be denoted $L$, may be formed 308. The coefficient matrix, $L$, may be formed by concatenating $N$ vectors, $L_i = [a_i\ b_i\ c_i]$, $i=1,\ldots, N$, where $N$ denotes the number of lines in the horizontal line group and $a_i$, $b_i$, $c_i$ denote the implicit-form coefficients of the $i^{th}$ line in the horizontal line group. A singular value decomposition (SVD) may be applied 310 to the coefficient matrix, $L$. A corresponding set of eigenvectors and eigenvalues, which may be denoted $\{\{v_1,\lambda_1\}, \{v_2,\lambda_2\}, \{v_3,\lambda_3\}\}$, where $\lambda_1 > \lambda_2 > \lambda_3$, may result from the singular value decomposition. An eigen-ratio, which may be denoted $\Lambda$, of the smallest eigenvalue to the largest eigenvalue may be calculated 312 according to:

$$\Lambda = \frac{\lambda_3}{\lambda_1}.$$

The eigen-ratio, $\Lambda$, may be a measure of the convergence of the lines in the horizontal line group to a singular vanishing point. A horizontal line group with a large eigen-ratio, $\Lambda$, may correspond to a group of lines whose pair-wise intersections vary significantly, while a horizontal line group with a small eigen-ratio, $\Lambda$, may correspond to a group of lines wherein the lines generally intersect at substantially the same point.

The baseline measure for the horizontal line group may be compared 314 to a horizontal baseline threshold, which may be denoted $T_{Hbaseline}$, and the eigen-ratio may be compared to a horizontal eigen-ratio threshold, which may be denoted $T_{Heigenratio}$, and when a condition associated with a wide horizontal baseline and good line convergence to a singular point is met 316, then a horizontal vanishing point may be calculated 318 using the eigenvector associated with the smallest eigenvalue. In some embodiments of the present invention, the condition associated with a wide horizontal baseline and good line convergence to a singular point may described by $(baseline > T_{Hbaseline}) \& (\Lambda < T_{Heigenratio})$, where & is a logical "AND" operator. In an exemplary embodiment, $$T_{Hbaseline} = \frac{imgH}{2},$$

where imgH denotes the horizontal image dimension, and $T_{Heigenratio} = 0.0005$.

When the condition associated with a wide horizontal baseline and good line convergence is met 316, the horizontal vanishing point may be calculated 318 according to:

$$vp_H = \begin{bmatrix} x_{vph} = \frac{v_3(1)}{v_3(3)} \\ y_{vph} = \frac{v_3(2)}{v_3(3)} \end{bmatrix},$$

where $v_3(1)$, $v_3(2)$ and $v_3(3)$ are the first, second and third components, respectively, of the eigenvector $v_3 = [v_3(1)\ v_3(2)\ v_3(3)]$. The calculated horizontal vanishing point may be returned 320 from the horizontal-vanishing-point estimator.

When the condition associated with a wide horizontal baseline and good line convergence is not met 322, the mean of the normal lines to the lines in the horizontal line group, $L_H$, may be calculated 324. For each line, $L_i$, in the horizontal line group, $L_H$, a normal line, which may be denoted $n_i$, may be determined. The mean of the N normal lines may be determined according to $$\frac{1}{N}\sum_{i=1}^{N} n_i.$$

The direction perpendicular to the mean of the normal lines may be determined 326 and returned 328, from the horizontal-vanishing-point estimator, as the horizontal vanishing direction.

When the number of lines in the horizontal line group is examined 304, if there are not more than two lines in the horizontal line group 330, then the number of lines in the horizontal line group may be examined 332 to determine if there are exactly two lines in the horizontal line group. If there are 334 exactly two lines in the horizontal line group, then the horizontal baseline measure for the group may be compared 336 to a horizontal baseline threshold, which may be denoted $T_{Hbaseline}$, and a measure of how parallel the two lines are may be compared to parallel-measure threshold, which maybe denoted $T_{Hparallel}$, and when a condition associated with a short horizontal baseline or very nearly parallel lines is met 344, then a horizontal vanishing direction may be calculated 346 by determining the direction perpendicular to the average of the two lines in the horizontal line group. In some embodiments of the present invention, the measure of how parallel the two lines in the horizontal line group are may be measure by determining the angle between the normals to the lines. In some embodiments of the present invention, the condition associated with a short horizontal baseline or very nearly parallel lines may described by (baseline<$T_{Hbaseline}$)|(angle<$T_{Hparallel}$), where | is a logical "OR" operator. In an exemplary embodiment, $$T_{Hbaseline} = \frac{imgH}{2},$$

where imgH denotes the horizontal image dimension, and $T_{Hparallel}=1°$. The horizontal vanishing direction may be returned 348. If the two lines are not nearly parallel and have a wide horizontal baseline 338, then the horizontal vanishing point may be calculated 340 by determining the intersection of the two lines in the horizontal line group, and the horizontal vanishing point may be returned 342.

When the number of lines in the horizontal line group is examined 332, if there are not exactly two lines in the horizontal line group 350, then the number of lines in the horizontal line group may be examined 352 to determine if there is exactly one line in the horizontal line group. If there is 354 exactly one line in the horizontal line group, then the direction perpendicular to the line normal is determined 356 and returned 358 as the horizontal vanishing direction. If there is not 360 exactly one line in the horizontal line group, then the vanishing direction for the horizontal line group is returned 362 as the cardinal horizontal line [1 0].

Figure 4A:
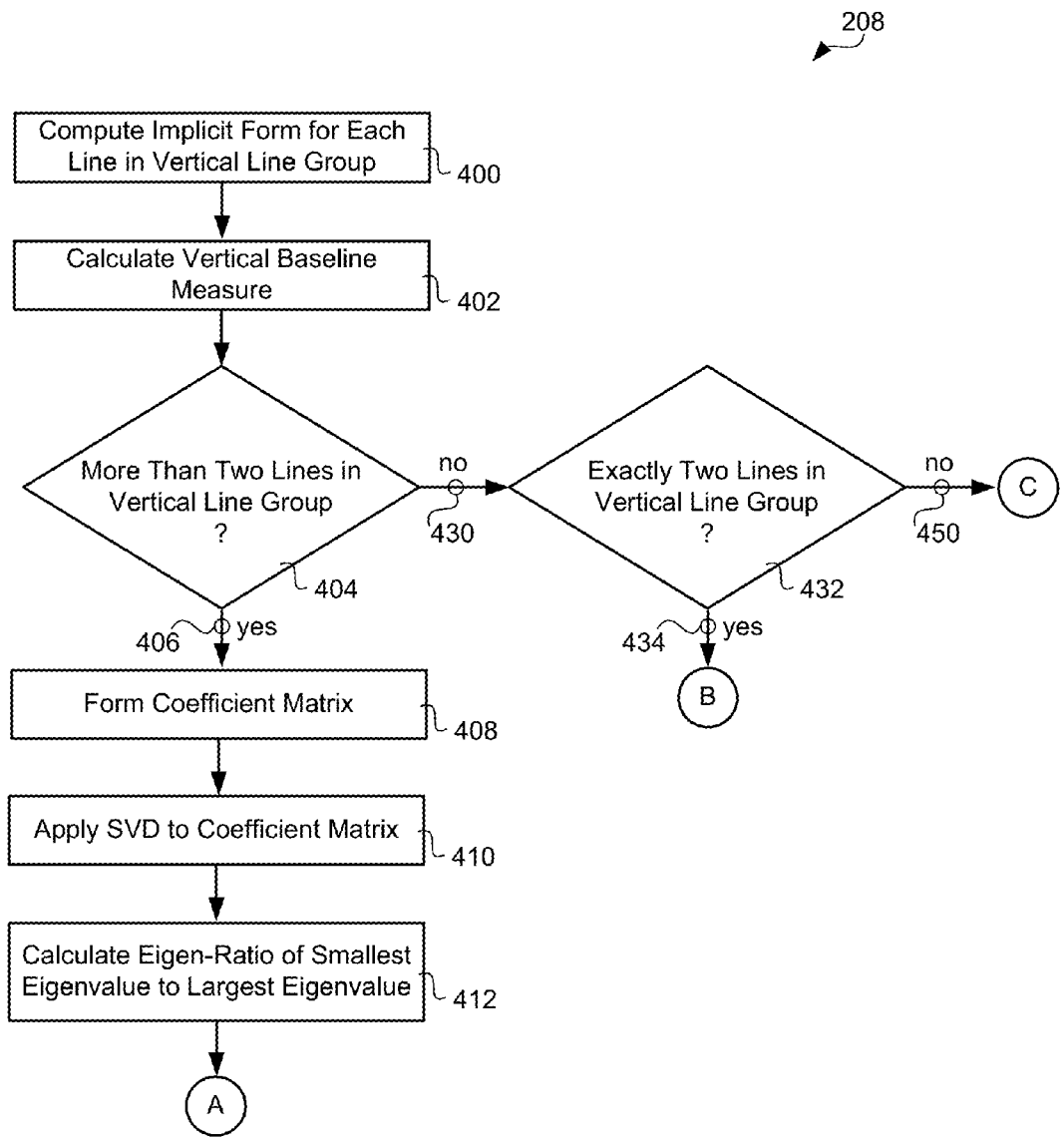
FIG. 4A-4C are a chart showing exemplary embodiments of the present invention comprising estimation of vertical vanishing information using a vertical line group.
Figure 4B:
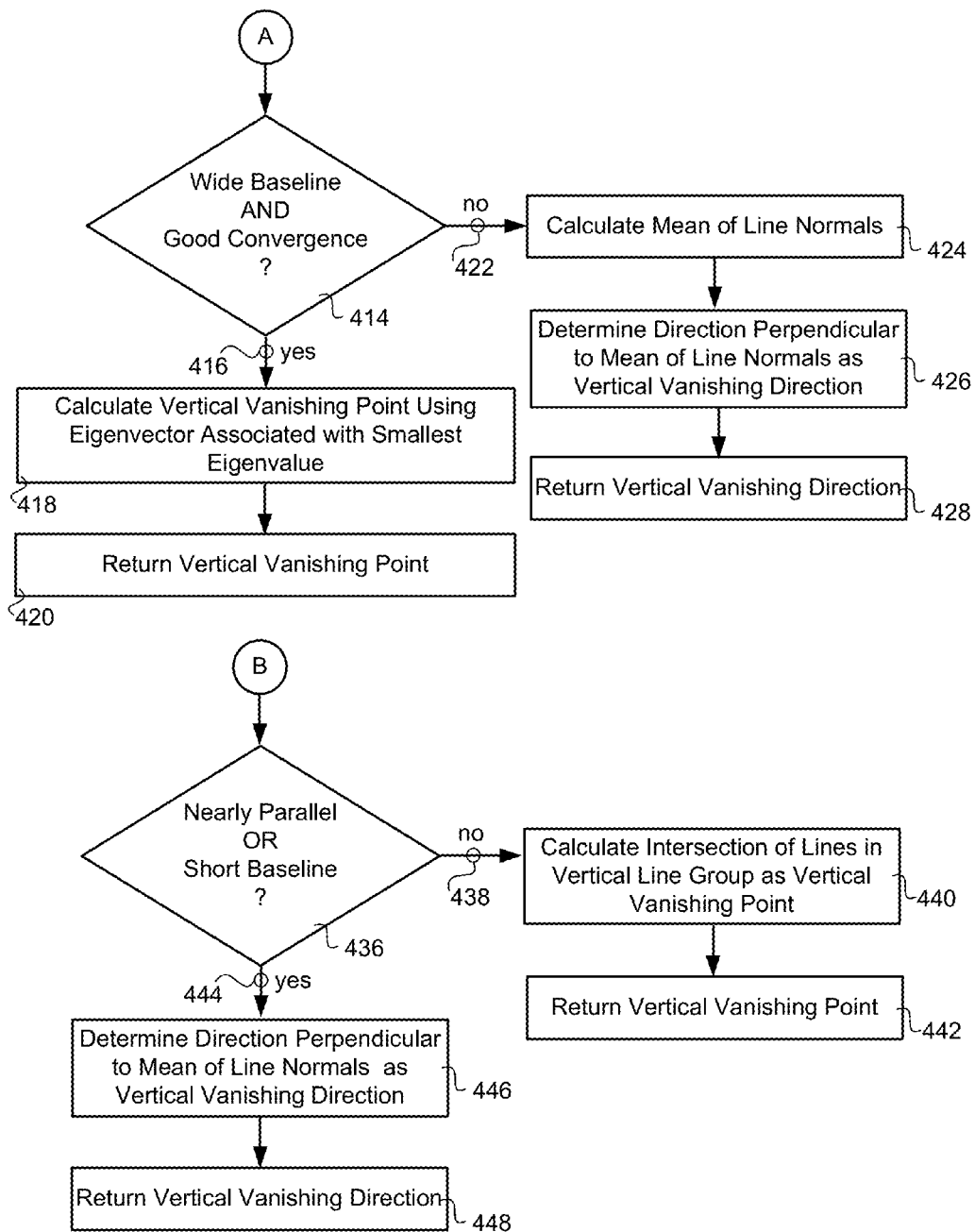
Figure 4C:
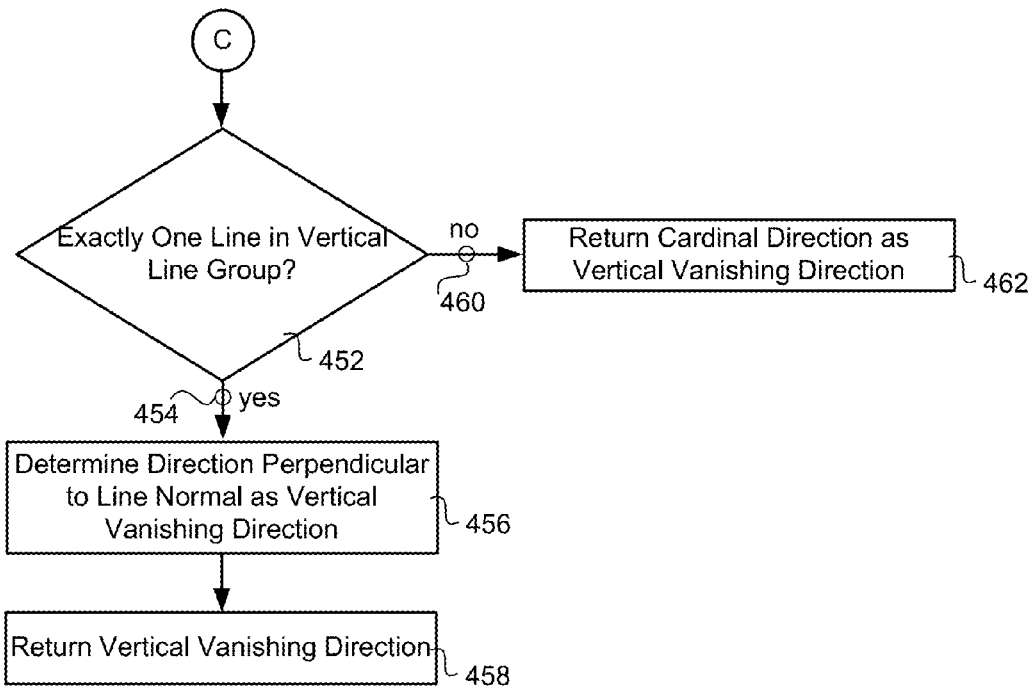

Vanishing-point estimation for a vertical line group, may be understood in relation to FIG. 4. FIG. 4 illustrates exemplary method(s) 208 of vertical-vanishing-point estimation, for a vertical line group, according to embodiments of the present invention. The order in which the method is described is not intended to be construed as a limitation, and any number of the described method blocks may be combined in any order to implement the method, or an alternative method.

For each line in a vertical line group, $L_V$, the implicit form, ax+by+c=0, of the line may be computed 400. A vertical baseline measure may be calculated 402 for the vertical line group. The vertical baseline measure, which may be denoted baseline$_v$, corresponding to the vertical line group, $L_V$, may be defined according to:

$$baseline_V = \left\{ \begin{array}{c} \max_{i,j,i \neq j} (d_{i,j}) : d_{i,j} = \|(L_i \cap H) - (L_j \cap H)\|, \\ \{L_i, L_j\} \in L_V \end{array} \right\}$$

where $d_{i,j}$ denotes the distance between the intersection of a first line, $L_i$, in the vertical line group, and a horizontal line, H, passing through the center of the image, and the intersection of a second line, $L_j$, in the vertical line group, and the horizontal line, H, passing through the center of the image.

The number of lines in the vertical line group may be examined 404, and if there are 406 more than two lines in the vertical line group, a coefficient matrix, which may be denoted L, may be formed 408. The coefficient matrix, L, may be formed by concatenating N vectors, $L_i = [a_i \ b_i \ c_i]$, i=1, ..., N, where N denotes the number of lines in the vertical line group and $a_i$, $b_i$, $c_i$ denote the implicit-form coefficients of the $i^{th}$ line in the vertical line group. A singular value decomposition (SVD) may be applied 410 to the coefficient matrix, L. A corresponding set of eigenvectors and eigenvalues, which may be denoted $\{\{v_1,\lambda_1\}, \{v_2,\lambda_2\}, \{v_3,\lambda_3\}\}$, where $\lambda_1 > \lambda_2 > \lambda_3$, may result from the singular value decomposition. An eigen-ratio, which may be denoted $\Lambda$, of the smallest eigenvalue to the largest eigenvalue may be calculated 412 according to:

$$\Lambda = \frac{\lambda_3}{\lambda_1}.$$

The eigen-ratio, $\Lambda$, may be a measure of the convergence of the lines in the vertical line group to a singular vanishing point. A vertical line group with a large eigen-ratio, $\Lambda$, may correspond to a group of lines whose pair-wise intersections vary significantly, while a vertical line group with a small eigen-ratio, $\Lambda$, may correspond to a group of lines wherein the lines generally intersect at substantially the same point.

The baseline measure for the vertical line group may be compared 414 to a vertical baseline threshold, which may be denoted $T_{Vbaseline}$, and the eigen-ratio may be compared to a vertical eigen-ratio threshold, which may be denoted $T_{Veigenratio}$, and when a condition associated with a wide vertical baseline and good line convergence to a singular point is met 416, then a vertical vanishing point may be calculated 418 using the eigenvector associated with the smallest eigenvalue. In some embodiments of the present invention, the condition associated with a wide vertical baseline and good line convergence to a singular point may described by (baseline>$T_{Vbaseline}$)&($\Lambda<T_{Veigenratio}$), where & is a logical "AND" operator. In an exemplary embodiment, $$T_{Vbaseline} = \frac{imgV}{2},$$

where imgV denotes the vertical image dimension, and $T_{Veigenratio}=0.0005$.

When the condition associated with a wide vertical baseline and good line convergence is met 416, the vertical vanishing point may be calculated 418 according to:

$$vp_V = \begin{bmatrix} x_{vpv} = \frac{v_3(1)}{v_3(3)} \\ y_{vpv} = \frac{v_3(2)}{v_3(3)} \end{bmatrix},$$

where $v_3$ (1), $v_3$ (2) and $v_3$ (3) are the first, second and third components, respectively, of the eigenvector $v_3 = [v_3$ (1) $v_3$ (2) $v_3$ (3)]. The calculated vertical vanishing point may be returned 420 from the vertical-vanishing-point estimator.

When the condition associated with a wide vertical baseline and good line convergence is not met 422, the mean of the normal lines to the lines in the vertical line group may be calculated 424. For each line, $L_i$, in the vertical line group, a normal line, which may be denoted $n_i$, may be determined. The mean of the N normal lines may be determined according to $$\frac{1}{N} \sum_{i=1}^{N} n_i.$$

The direction perpendicular to the mean of the normal lines may be determined 426 and returned 428, from the horizontal-vanishing-point estimator, as the vertical vanishing direction.

When the number of lines in the vertical line group is examined 404, if there are not more than two lines in the vertical line group 430, then the number of lines in the vertical line group may be examined 432 to determine if there are exactly two lines in the vertical line group. If there are 434 exactly two lines in the vertical line group, then the vertical baseline measure for the group may be compared 436 to a vertical baseline threshold, which may be denoted $T_{Vbaseline}$, and a measure of how parallel the two lines are may be compared to parallel-measure threshold, which maybe denoted $T_{Vparallel}$ and when a condition associated with a short vertical baseline or very nearly parallel lines is met 444, then a vertical vanishing direction may be calculated 446 by determining the direction perpendicular to the average of the two lines in the vertical line group. In some embodiments of the present invention, the measure of how parallel the two lines in the vertical line group are may be measure by determining the angle between the normals to the lines. In some embodiments of the present invention, the condition associated with a short vertical baseline or very nearly parallel lines may described by (baseline<$T_{Vbaseline}$)|(angle<$T_{Vparrallel}$), where | is a logical "OR" operator. In an exemplary embodiment, $$T_{Vbaseline} = \frac{imgV}{2},$$

where imgV denotes the vertical image dimension, and $T_{Vparallel}=1°$. The vertical vanishing direction may be returned 448. If the two lines are not nearly parallel and have a wide horizontal baseline 438, then the vertical vanishing point may be calculated 440 by determining the intersection of the two lines in the vertical line group, and the vertical vanishing point may be returned 442.

When the number of lines in the vertical line group is examined 432, if there are not exactly two lines in the vertical line group 450, then the number of lines in the vertical line group may be examined 452 to determine if there is exactly one line in the vertical line group. If there is 454 exactly one line in the vertical line group, then the direction perpendicular to the line normal is determined 456 and returned 458 as the vertical vanishing direction. If there is not 460 exactly one line in the vertical line group, then the vanishing direction for the vertical line group is returned 462 to be orthogonal to the horizontal vanishing direction.

Referring again to FIG. 1, a corner detector may be used to perform corner detection 106. The corner detector maybe used to determine the extent of the document region and to separate the document region from background clutter. The corner detector may respond well to the intersection of strokes, thus resulting in a high density of detected corners within text regions and a lighter detection density in non-text areas. The regions with a high density of detected corners may be good candidate regions for documents. In some embodiments of the present invention, a Shi-Tomasi corner detector may be used to perform corner detection 106. The Shi-Tomasi corner detector is described in an article entitled "Good Features to Track," authored by Jianbo Shi and Carlo Tomasi, published in the $9^{th}$ IEEE Conference on Computer Vision and Pattern Recognition, in June 1994, said article is hereby incorporated by reference herein in its entirety. In alternative embodiments, the corner detector may comprise one of the other corner detection methods known in the art. In some embodiments of the present invention, the corner detector may produce a corner-point list and a corner mask, which may be denoted C, wherein a pixel value within the corner mask indicates whether, or not, the associated pixel in the input image is a detected corner pixel. In some embodiments of the present invention, a pixel value of "1" in the corner mask may indicate that the pixel location is associated with a detected corner, and a pixel value of "0" may indicate that the pixel location is not associated with a detected corner.

Results from the vanishing-point detection and the corner detection may be used by a quadrilateral-boundary detector to perform 108 quadrilateral-boundary detection. A document quadrilateral, also considered a perspective-distorted document rectangle, may be formed by the quadrilateral-boundary detector. In some embodiments of the present invention, the document quadrilateral may be a bounding quadrilateral, wherein the bounding-quadrilateral sides converge to the estimated vanishing points, if vanishing points were returned, or are parallel to the estimated vanishing directions, if vanishing directions were returned. The bounding quadrilateral may also encompass the corners detected by the corner detector. In some embodiments of the present invention, all detected corners must be encompassed by the bounding quadrilateral. In alternative embodiments, not all detected corners must be encompassed by the bounding quadrilateral.

Geometric rectification quality measures may be determined 110 from the estimated bounding quadrilateral and the vanishing points, or vanishing directions. The geometric rectification quality measures may measure the geometric rectification strength and the numerical stability of a pose estimate and a camera parameter estimate. The geometric rectification quality measures may be used to compare multiple estimates.

In some embodiments of the present invention, when the camera that captured the document image has an unknown effective focal length, measured in pixels, a full geometric rectification may only be performed when two vanishing points are detected. In some embodiments of the present invention, multiple focal length measures may be calculated to determine if the document bounding quadrilateral and corresponding vanishing points may be considered to have a reliable focal estimate.

Figure 5:
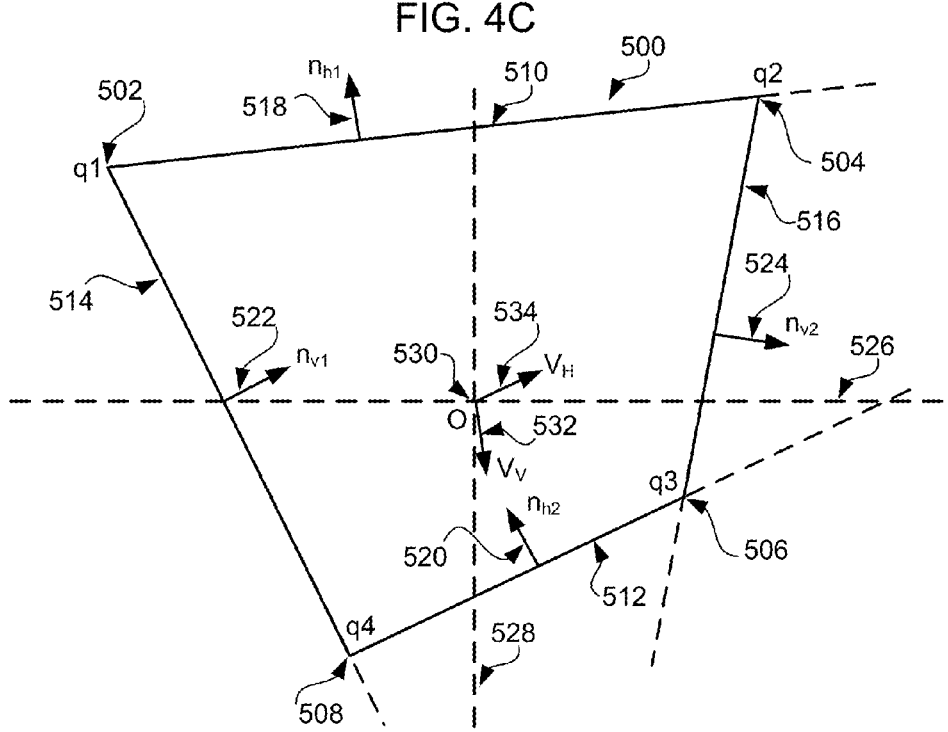
FIG. 5 is a picture illustrating an exemplary bounding document quadrilateral.

In some embodiments of the present invention, a first focal length measure, which may be denoted #vp, may be associated with the quality of the focal length estimate. The first focal length measure may be determined by counting the number of vanishing points, excluding those whose boundary lines are nearly parallel. These embodiments may be understood in relation to FIG. 5. FIG. 5 illustrates an exemplary bounding document quadrilateral 500 defined by four vertices, labeled q1 502, q2 504, q3 506 and q4 508. A horizontal boundary pair may be defined as the two horizontal sides 510, 512 of the bounding quadrilateral 500, and a vertical boundary pair may be defined as the two vertical sides 514, 516 of the document bounding quadrilateral. The angle, in degrees, between the horizontal boundary pair may be determined according to:

$$\theta_h = \frac{180\cos^{-1}(n_{h1} \cdot n_{h2})}{\pi},$$

where $n_{h1}$ 518 and $n_{h2}$ 520 are the unit normals to the horizontal sides 510, 512, respectively, and · denotes the vector dot product. The angle, in degrees, between the vertical boundary pair may be determined according:

$$\theta_v = \frac{180\cos^{-1}(n_{v1} \cdot n_{v2})}{\pi},$$

where $n_{v1}$ 522 and $n_{v2}$ 524 are the unit normals to the vertical sides 514, 516, respectively, and · denotes the vector dot product. The first focal length measure may be determined according to:

$$\#vp = \begin{cases} 0, & \theta_v < th_{\|} \text{ and } \theta_h < th_{\|} \\ 1, & \theta_v < th_{\|} \text{ or } \theta_h < th_{\|} \\ 2, & \text{otherwise,} \end{cases}$$

where $th_{\|}$ denotes a threshold below which lines may be considered parallel. In an exemplary embodiment, $th_{\|}=1$ degree.

In some embodiments of the present invention, which may be understood in relation to FIG. 5, a second focal length measure, which may be denoted farVPDist, may be calculated. The second focal length measure may measure the maximum distance from the image optical center 530, which may be denoted O, to the vanishing points, if they exist. In an exemplary embodiment, a horizontal vanishing point defined relative to the image optical center 530 may be determined according to:

$$vpC_H = vp_H - O,$$

where $vpC_H$ denotes the horizontal vanishing point defined relative to the image optical center 530, O, $vp_H$ denotes the horizontal vanishing center, and where the image optical center 530, O, and the horizontal vanishing center, $vp_H$, are in image coordinates. In an exemplary embodiment, a vertical vanishing point defined relative to the image optical center 530 may be determined according to:

$$vpC_V = vp_V - O,$$

where $vpC_V$ denotes the horizontal vanishing point defined relative to the image optical center 530, O, $vp_V$ denotes the horizontal vanishing center, and where the image optical center 530, O, and the horizontal vanishing center, $vp_V$, are in image coordinates. The second focal length measure may be determined according to:

$$\text{far}VP\text{Dist} = \max(\|vpC_H\|, \|vpC_V\|),$$

where $\|\cdot\|$ denotes a norm operator. In some embodiments of the present invention, the $L_2$ norm may be used.

In some embodiments of the present invention a third focal length measure, which may be denoted vptest, may be calculated. The third focal length measure may be determined according:

$$vptest = vpC_H \cdot vpC_V,$$

where · denotes the vector dot product and $vpC_H$ and $vpC_V$ denote the horizontal vanishing point with respect to the image optical center and the vertical vanishing point with respect to the image optical center, respectively, if they exist.

A focal length estimate may be defined according to:

$$\hat{f} = \begin{cases} \sqrt{-vptest}, & vptest < 0 \\ \text{undefined,} & \text{otherwise.} \end{cases}$$

A fourth focal length measure, which may be denoted FOV, may be defined if the estimated focal length, $\hat{f}$, is defined. The fourth focal length measure, FOV, may measure the field-of-view, in degrees, for the maximum image dimension, and may be calculated according to:

$$FOV = \frac{360}{\pi} \tan^{-1}\left(\frac{\max(imgW, imgH)}{\hat{f}}\right),$$

where imgW and imgH denote the image width and the image height, respectively.

In some embodiments of the present invention, the focal length estimate, $\hat{f}$, associated with a document quadrilateral and the corresponding vanishing points may be considered reliable when a focal-length-estimate reliability condition is met. In some embodiments of the present invention, the focal length estimate, $\hat{f}$, may be considered reliable when estF= (#vp==2) and (vptest<0) and (FOV>$th_{FOV}$) and (farVPDist<$th_{VPDist}$) is true, where $th_{FOV}$ and $th_{VPDist}$ are a field-of-view threshold value and a maximum-distance threshold value, respectively, and estF is a Boolean indicator of the reliability of the focal length estimate. In some embodiments of the present invention, $th_{FOV}=20°$ and $th_{VPDist}=5\times 10^4$ In some embodiments of the present invention, described in relation to FIG. 5, the angle between vanishing points may be determined according to:

$$VPAngle = \frac{180}{\pi}\cos^{-1}(V_V \cdot V_H),$$

where $$V_V = \frac{vpC_V}{\|VpC_V\|} \text{ and } V_H = \frac{vpC_H}{\|vpC_H\|},$$

where $V_V$ 532 and $V_H$ 534 denote the unit vectors from the optical center in the direction of the vertical and horizontal vanishing points, respectively. If a vertical vanishing point does not exist, then the vertical vanishing direction may be defined as:

$$V_V \perp \left(\frac{(n_{v1} + n_{v2})}{\|n_{v1} + n_{v2}\|}\right).$$

If a horizontal vanishing point does not exist, then the horizontal vanishing direction may be defined as:

$$V_H \perp \left(\frac{(n_{h1} + n_{h2})}{\|n_{h1} + n_{h2}\|}\right).$$

In some embodiments of the present invention, a measure of correction strength may be determined. In some exemplary embodiments, the correction strength measure maybe the angle between the optical axis and the estimated document planar normal predicted from the document quadrilateral. For a camera with a known focal length, the document normal may be estimated according to:

$$n_p = \frac{VC_H \times VC_V}{\|VC_H\|\|VC_V\|},$$

where $$VC_H = \begin{cases} [vpC_H, \hat{f}], & \theta_H \geq th_{\|} \\ [V_H, 0], & \text{otherwise} \end{cases}$$

is a three-element vector formed from the estimated vanishing point, $vpC_H$, and focal length, $\hat{f}$, when the vanishing point exists, or vanishing direction, $V_H$, when the vanishing point does not exist, and
where $$VC_V = \begin{cases} [vpC_V, \hat{f}], & \theta_V \geq th_{\|} \\ [V_V, 0], & \text{otherwise} \end{cases}$$

is a three-element vector formed from the estimated vanishing point, $vpC_V$, and focal length, $\hat{f}$, when the vanishing point exists, or vanishing direction, $V_V$, when the vanishing point does not exist.

In some embodiments of the present invention, when estF is "false," then a default focal length may be determined according to:

$$f\_default = \frac{\frac{\max(imgW, imgH)}{2}}{\tan\left(\frac{\pi \cdot 50°}{2 \cdot 180}\right)},$$

where a default field-of-view is 50 degrees.

A correction angle may be determined according to:

$$correctionAngle = \frac{180}{\pi}\cos^{-1}(n_p \cdot z),$$

where z=[0,0,1].

Referring to FIG. 1, rectification hypotheses may be filtered 116 to compare multiple estimates of a document quadrilateral and determine which estimate to use in an image rectification process. Alternative bounding regions may be received 112, and geometric rectification quality measures may be determined 114 for the alternative bounding regions. In some embodiments of the present invention, the normal pose, corresponding to a non-oblique angle view, may be included in the list of possible poses. The normal pose represents a pose where no geometric rectification is necessary due to the document normal being collinear to the observer's optical axis.

Each rectification hypothesis and corresponding vanishing points may be processed to determine their associated geometric rectification quality measures, (correctionAngle$_i$, vpAngle$_i$, #vp$_i$) where the subscript i may denote the associated hypothesis, which may be denoted H$_i$. The hypothesis associated with the normal pose may be denoted H'. In some embodiments of the present invention, an overlap measure may be calculated wherein an intersection between the document area defined by the document quadrilateral, which may be denoted Q$_i$, and the detected corners, which may be denoted C, may be performed to determined the percentage of corners within the document area. The overlap measure for a hypothesis, which may be denoted overlap$_i$, may be determined according to:

$$overlap_i = \frac{\sum Q_i \cap C}{\sum C},$$

where ∩ denotes an intersection operator.

In some embodiments of the present invention, no alternative bounding regions may be received. In these alternative embodiments, only the hypothesis associated with the normal pose and a hypothesis associated with the document quadrilateral and corresponding vanishing points, or vanishing directions, determined according to the line-group methods described herein, may be filtered.

In some embodiments of the present invention, two hypotheses may be examined in addition to the hypothesis, H', associated with the normal pose. A first hypothesis, which may be denoted H$_1$, associated with the document quadrilateral and corresponding vanishing points, or vanishing directions, determined according to the line-group methods described herein. A second hypothesis, which may be denoted H$_2$ may be associated with a document region determined by a region-growing method. In some embodiments of the present invention, the alternative, second, hypothesis, H$_2$, may be formed using a region-growing technique, for example, the technique described in U.S. patent application Ser. No. 13/034,594, filed on Feb. 24, 2011, entitled "Methods and Systems for Determining a Document Region-of-Interest in an Image," and invented by Ahmet Mufit Ferman and Lawrence Shao-hsien Chen, said application, U.S. patent application Ser. No. 13/034,594, is hereby incorporated by reference herein in its entirety.

In some embodiments of the present invention, filtering, also considered verification, of a geometric rectification hypothesis may depend on the method used to derive the hypothesis. When a hypothesis is derived using line groups according to embodiments of the present invention described herein, the hypothesis, H$_1$, may be rejected when correctionAngle$_1$>θ$_{max}$, where θ$_{max}$ may denote the maximum correction angled deemed reliable and wherein, in an exemplary embodiment, θ$_{max}$=40°. The hypothesis, H$_1$, may be rejected if the number of vanishing points is two and if the vanishing point angle associated with the hypothesis does not fall within a range of vanishing-point angles. In an exemplary embodiment, this condition may be:

vp$_1$=2 and (vpAngle$_1$<80° or vpAngle$_1$>110°).

In some embodiments of the present invention comprising an alternative hypothesis comprising a region-growing technique, a hypothesis may be rejected if the correction angle is greater than an angle threshold and if the overlap is less than an overlap threshold. In an exemplary embodiment, this condition may be:

correctionAngle$_2$>θ$_{max}$ and overlap$_2$<th$_C$, where θ$_{max}$ may denote the maximum correction angled deemed reliable and th$_C$ may denote the percentage of corners that must be within the document region for the hypothesis to be verified. In an exemplary embodiment, θ$_{max}$=40° and th$_C$=98%. The hypothesis may also be rejected when the shape of the region returned by the region-growing technique does not sufficiently match a quadrilateral shape.

In some embodiments of the present invention, rectification hypothesis filtering 116 may comprise a hierarchical decision. If the region-growing-based hypothesis, H$_2$ is verified, then the region-growing-based hypothesis is selected for geometric correction. If the region-growing-based hypothesis, H$_2$, is not verified and the line-groups hypothesis, H$_1$, is verified, then the line-groups hypothesis, H$_1$, is selected for geometric correction. Otherwise, the normal hypothesis, H', is selected, and geometric rectification for the image may be disabled.

For full geometric rectification, the relative lengths of the documents sides are known. Full geometric rectification may not always be possible. When full geometric rectification is not possible, an approximation may be used to determine an estimate for the approximate camera perspective geometry and the document normal.

Figure 6:
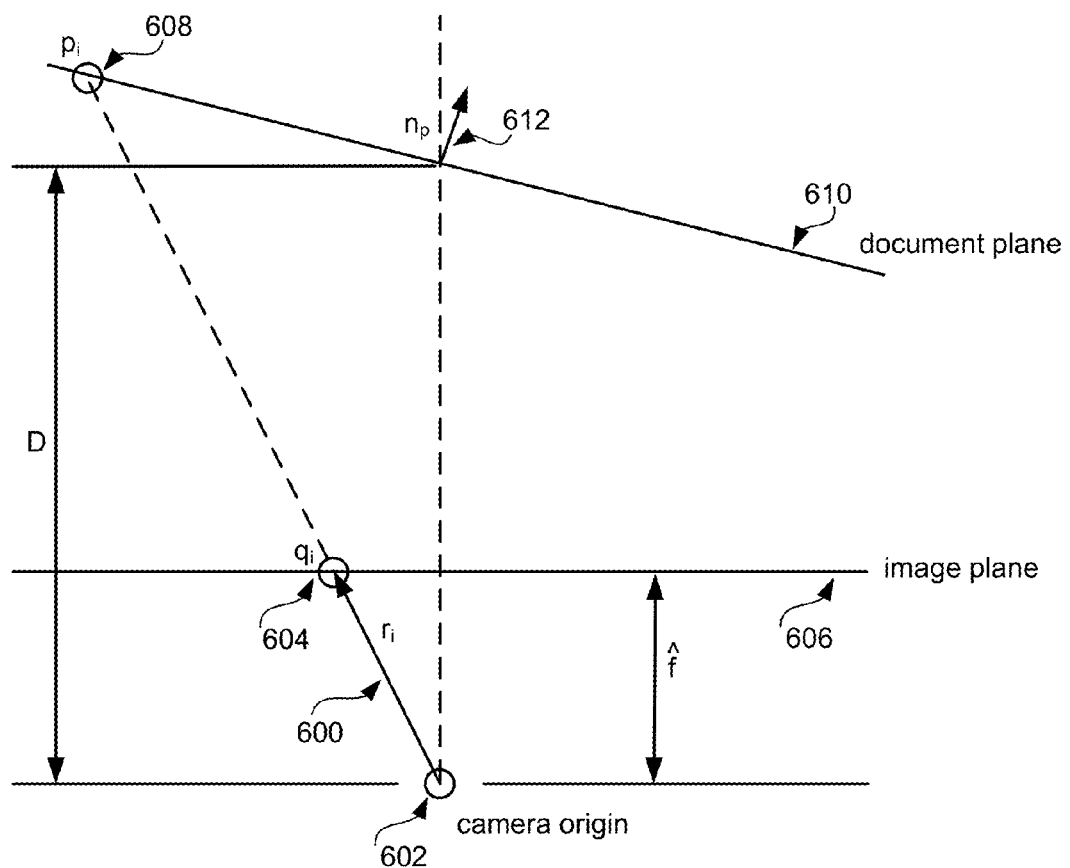
FIG. 6 is a picture illustrating rectified image size determination.

When the camera focal length is not known a priori or when the estimate of the focal length is not reliable, for example, when estF is "false," the default focal length may be used. The rectified image size may be determined 118, as illustrated in relation to FIG. 5 and to FIG. 6, by projecting a ray 600, r$_i$, from the camera origin 602 through the quadrilateral points [q$_1$, q$_2$, q$_3$, q$_4$], one shown 604, q$_i$, in the image plane 606 to a point 608, p$_i$, in the document plane 610 D units away from the camera's origin 602. Any point, p, in the document plane

610 may be defined according to the implicit equation $n_p \cdot (p - p_0) = 0$, where $p_0 = [0 \ 0 \ D]$. The point 608, $p_i$, may be determined according to:

$$p_i = \left(\frac{n_p \cdot p_0}{n_p \cdot r_i}\right) r_i,$$

where $n_p$ is the unit normal to the document plane 610 and · denotes the vector dot product. The points $[p_1, p_2, p_3, p_4]$ define the document rectangle in the document plane 610 and a distance D units from the camera projection original 602. In some embodiments of the present invention, $D=5\hat{f}$, where $\hat{f}$ is the focal length estimate.

The document aspect ratio, which may be denoted $\hat{A}$, may be estimated according to $$\hat{A} = \frac{\hat{H}}{\hat{W}},$$

where $\hat{H}$ and $\hat{W}$ are the estimated document height and width, respectively, in the document plane 610, and $\hat{H}$ may be determined according to $\hat{H} = \|p_4 - p_1\|$ and $\hat{W}$ may be determined according to $\hat{W} = \|p_2 - p_1\|$.

The scale of the rectified image may be determined from the quadrilateral points, $[q_1, q_2, q_3, q_4]$, and the document aspect ratio, $\hat{A}$. The rectified image size, which may be denoted $(\hat{w}, \hat{h})$, may be determined according to:

$$(\hat{w}, \hat{h}) = \begin{cases} (s_h, s_h \hat{A}), & \text{if } s_h > s_v \\ \left(\frac{s_v}{\hat{A}}, s_v\right), & \text{otherwise,} \end{cases}$$

where $s_h = \min(\max(dh_1, dh_2), \text{imgW})$ is the maximum horizontal line length clipped to the input image width, imgW, $s_v = \min(\max(dv_1, dv_2), \text{imgH})$ is the maximum vertical line length clipped to the input image height, imgH, and $dh_1 = \|q_2 - q_1\|$ is the length of the line between the upper quadrilateral points, $dh_2 = \|q_3 - q_4\|$ is the length of the line between the lower quadrilateral points, $dv_1 = \|q_4 - q_1\|$ is the length of the line between the left-most quadrilateral points and $dv_2 = \|q_3 - q_2\|$ the length of the line between the right-most quadrilateral points.

Referring to FIG. 1, image rectification may be performed 120. In some embodiments of the present invention, image rectification 120 may use bi-cubic interpolation to apply the geometric rectification based on the estimated image quadrilateral and the desired output rectangle. In some embodiments of the present invention, image rectification may comprise computation of a perspective homography using four input points, $[q_1, q_2, q_3, q_4]$ and the corresponding desired output points of the rectified image determined from the computed rectified-image size, $[(0,0), (\hat{w},0), (\hat{w}, \hat{h}), (0,\hat{h})]$. Perspective de-warping using the computed homography may result in the rectified image, also considered the corrected image.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that software, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for correcting perspective distortion in a camera-captured document image, said method comprising:
   receiving a camera-captured document image in a processor;
   estimating horizontal vanishing information for said camera-captured document image;
   estimating vertical vanishing information for said camera-captured document image;
   performing corner detection on said camera-captured document image, thereby identifying a plurality of corner points in said camera-captured document image;
   performing quadrilateral-boundary detection using a result of said corner detection and said horizontal vanishing information and said vertical vanishing information, thereby identifying a first bounding quadrilateral, wherein a number of corner points, in said plurality of corner points, encompassed by said first bounding quadrilateral meets a first criterion;
   determining a first plurality of geometric rectification quality measure values associated with said first bounding quadrilateral;
   selecting a rectification hypothesis based on said first plurality of geometric rectification quality measure values;
   determining a rectified-image size using said selected rectification hypothesis; and
   when said selected rectification hypothesis is not a hypothesis associated with a normal pose, rectifying said camera-captured document image using said selected rectification hypothesis, thereby producing a corrected document image.

2. A method as described in claim 1, wherein when said selected rectification hypothesis is said hypothesis associated with a normal pose, said camera-captured document image is not rectified.

3. A method as described in claim 1, wherein said horizontal vanishing information is a horizontal vanishing point or a horizontal vanishing direction.

4. A method as described in claim 1, wherein said vertical vanishing information is a vertical vanishing point or a vertical vanishing direction.

5. A method as described in claim 1 further comprising:
receiving an alternative bounding region;
determining a second plurality of geometric rectification quality measure values associated with said alternative bounding region; and
wherein said selecting a rectification hypothesis is further based on said second plurality of geometric rectification quality measure values.

6. A method as described in claim 5, wherein said alternative bounding region is generated by a region-growing technique.

7. A method as described in claim 5, wherein said selecting a rectification hypothesis comprises:
performing a first verification process on a first hypothesis associated with said alternative bounding region and said second plurality of geometric rectification quality measure values; and
when said first verification process rejects said first hypothesis:
performing a second verification process on a second hypothesis associated with said first bounding quadrilateral and said first plurality of geometric rectification quality measure values; and
when said second verification process rejects said second hypothesis, selecting said hypothesis associated with a normal pose as said rectification hypothesis; or
when said second verification process accepts said second hypothesis, selecting said second hypothesis as said rectification hypothesis; or
when said first verification process accepts said first hypothesis, selecting said first hypothesis as said rectification hypothesis.

8. A method for correcting perspective distortion in a camera-captured document image, said method comprising:
receiving a camera-captured document image in a processor;
estimating horizontal vanishing information for said camera-captured document image, wherein said estimating horizontal vanishing information comprises:
performing edge detection on said camera-captured document image, thereby producing an edge mask;
extracting a plurality of significant linear structures from said edge mask;
grouping said plurality of significant linear structures into a horizontal line set comprising a plurality of lines;
computing an implicit form for each line in said plurality of lines, thereby producing a plurality of coefficients;
calculating a horizontal baseline measure for said horizontal line set; and
when the number of lines in said plurality of lines is greater than two:
forming a coefficient matrix using said plurality of coefficients;
applying a singular value decomposition to said coefficient matrix, thereby determining a plurality of eigenvectors and a plurality of eigenvalues, wherein said plurality of eigenvalues comprises a smallest eigenvalue and a largest eigenvalue;
calculating an eigen-ratio, wherein said eigen-ratio is the ratio of said smallest eigenvalue to said largest eigenvalue;
performing a first comparison comparing said horizontal baseline measure to a horizontal baseline threshold;
performing a second comparison comparing said eigen-ratio to a horizontal eigen-ratio threshold; and
when said first comparison indicates a wide baseline and said second comparison indicates a good line convergence to a single point:
calculating a horizontal vanishing point using an eigenvector associated with said smallest eigenvalue; and
wherein said horizontal vanishing information is said horizontal vanishing point;
estimating vertical vanishing information for said camera-captured document image;
performing corner detection on said camera-captured document image;
performing quadrilateral-boundary detection using a result of said corner detection and said horizontal vanishing information and said vertical vanishing information, thereby identifying a first bounding quadrilateral;
determining a first plurality of geometric rectification quality measure values associated with said first bounding quadrilateral;
selecting a rectification hypothesis based on said first plurality of geometric rectification quality measure values;
determining a rectified-image size using said selected rectification hypothesis; and
when said selected rectification hypothesis is not a hypothesis associated with a normal pose, rectifying said camera-captured document image using said selected rectification hypothesis, thereby producing a corrected document image.

9. A method as described in claim 8 further comprising:
when said first comparison does not indicate a wide baseline or said second comparison does not indicate a good line convergence to a single point:
calculating a horizontal vanishing direction; and
wherein said horizontal vanishing information is said horizontal vanishing direction.

10. A method as described in claim 8 further comprising:
when the number of lines in said plurality of lines is exactly two:
performing a third comparison comparing a measure of an angle between a first normal associated with a first line in said plurality of lines and a second normal associated with a second line in said plurality of lines with a parallel-measure threshold;
when said first comparison indicates a short baseline or said third comparison indicates very nearly parallel lines:
calculating a horizontal vanishing direction, wherein said calculating comprises determining a direction perpendicular to the mean of said first normal and said second normal; and
wherein said horizontal vanishing information is said horizontal vanishing direction.

11. A method as described in claim 10 further comprising:
when said first comparison does not indicate a short baseline and said third comparison does not indicate very nearly parallel lines:
calculating a horizontal vanishing point by calculating an intersection of said first line and said second line; and
wherein said horizontal vanishing information is said horizontal vanishing point.

12. A method as described in claim 8 further comprising:
when the number of lines in said plurality of lines is exactly one:
- determining a normal to a first line in said plurality of lines;
- calculating a horizontal vanishing direction by determining a perpendicular direction to said normal; and
- wherein said horizontal vanishing information is said horizontal vanishing direction.

13. A method as described in claim 8 further comprising:
when the number of lines in said plurality of lines is zero:
- setting a horizontal vanishing direction to a cardinal horizontal direction; and
- wherein said horizontal vanishing information is said horizontal vanishing direction.

14. A method as described in claim 8, wherein a first significant linear structure in said plurality of linear structures is grouped into said horizontal line set when said first significant linear structure converges to a first horizontal vanishing point.

15. A method as described in claim 8, wherein said calculating a horizontal baseline measure comprises, for each pair of lines in said plurality of lines:
- determining a first intersection between a first line in said pair of lines and a vertical line, wherein said vertical line passes through the center of said camera-captured document image;
- determining a second intersection between a second line in said pair of lines and said vertical line;
- calculating a distance between said first intersection and said second intersection, thereby producing a plurality of distance measures; and
- setting said horizontal baseline measure to a maximum of said plurality of distance measures.

16. A method as described in claim 8, wherein said first comparison indicates a wide baseline when said horizontal baseline measure is greater than said horizontal baseline threshold.

17. A method as described in claim 8, wherein said second comparison indicates a good line convergence to a single point when said eigen-ratio is less than said eigen-ratio threshold.

18. A method for correcting perspective distortion in a camera-captured document image, said method comprising:
- receiving a camera-captured document image in a processor;
- estimating horizontal vanishing information for said camera-captured document image,
- estimating vertical vanishing information for said camera-captured document image, wherein said estimating vertical vanishing information comprises:
  - performing edge detection on said camera-captured document image, thereby producing an edge mask;
  - extracting a plurality of significant linear structures from said edge mask;
  - grouping said plurality of significant linear structures into a vertical line set comprising a plurality of lines;
  - computing an implicit form for each line in said plurality of lines, thereby producing a plurality of coefficients;
  - calculating a vertical baseline measure for said vertical line set; and
  - when the number of lines in said plurality of lines is greater than two:
    - forming a coefficient matrix using said plurality of coefficients;
    - applying a singular value decomposition to said coefficient matrix, thereby determining a plurality of eigenvectors and a plurality of eigenvalues, wherein said plurality of eigenvalues comprises a smallest eigenvalue and a largest eigenvalue;
    - calculating an eigen-ratio, wherein said eigen-ratio is the ratio of said smallest eigenvalue to said largest eigenvalue;
    - performing a first comparison comparing said vertical baseline to a vertical baseline threshold;
    - performing a second comparison comparing said eigen-ratio to a vertical eigen-ratio threshold; and
    - when said first comparison indicates a wide baseline and said second comparison indicates a good line convergence to a single point:
      - calculating a vertical vanishing point using an eigenvector associated with said smallest eigenvalue;
- performing corner detection on said camera-captured document image;
- performing quadrilateral-boundary detection using a result of said corner detection and said horizontal vanishing information and said vertical vanishing information, thereby identifying a first bounding quadrilateral;
- determining a first plurality of geometric rectification quality measure values associated with said first bounding quadrilateral;
- selecting a rectification hypothesis based on said first plurality of geometric rectification quality measure values;
- determining a rectified-image size using said selected rectification hypothesis; and
- when said selected rectification hypothesis is not a hypothesis associated with a normal pose, rectifying said camera-captured document image said selected rectification hypothesis, thereby producing a corrected document image.

19. A method as described in claim 18 further comprising:
when said first comparison does not indicate a wide baseline or said second comparison does not indicate a good line convergence to a single point:
- calculating a vertical vanishing direction; and
- wherein said vertical vanishing information is said vertical vanishing direction.

20. A method as described in claim 18 further comprising:
when the number of lines in said plurality of lines is exactly two:
- performing a third comparison comparing a measure of an angle between a first normal associated with a first line in said plurality of lines and a second normal associated with a second line in said plurality of lines with a parallel-measure threshold;
- when said first comparison indicates a short baseline or said third comparison indicates very nearly parallel lines:
  - calculating a vertical vanishing direction, wherein said calculating comprises determining a direction perpendicular to the mean of said first normal and said second normal; and
  - wherein said vertical vanishing information is said vertical vanishing direction.

21. A method as described in claim 20 further comprising:
when said first comparison does not indicate a short baseline and said third comparison does not indicate very nearly parallel lines:
- calculating a vertical vanishing point by calculating an intersection of said first line and said second line; and
- wherein said vertical vanishing information is said vertical vanishing point.

22. A method as described in claim 18 further comprising:
when the number of lines in said plurality of lines is exactly one:
- determining a normal to a first line in said plurality of lines;
- calculating a vertical vanishing direction by determining a perpendicular direction to said normal; and
- wherein said vertical vanishing information is said vertical vanishing direction.

23. A method as described in claim 18 further comprising:
when the number of lines in said plurality of lines is zero:
- setting a vertical vanishing direction to a cardinal vertical direction; and
- wherein said vertical vanishing information is said vertical vanishing direction.

24. A method as described in claim 18, wherein a first significant linear structure in said plurality of linear structures is grouped into said vertical line set when said first significant linear structure converges to a first vertical vanishing point.

25. A method as described in claim 18, wherein said calculating a vertical baseline measure comprises, for each pair of lines in said plurality of lines:
- determining a first intersection between a first line in said pair of lines and a horizontal line, wherein said horizontal line passes through the center of said camera-captured document image;
- determining a second intersection between a second line in said pair of lines and said horizontal line;
- calculating a distance between said first intersection and said second intersection, thereby producing a plurality of distance measures; and
- setting said vertical baseline measure to a maximum of said plurality of distance measures.

26. A method as described in claim 18, wherein said first comparison indicates a wide baseline when said vertical baseline measure is greater than said vertical baseline threshold.

27. A method as described in claim 18, wherein said second comparison indicates a good line convergence to a single point when said eigen-ratio is less than said eigen-ratio threshold.

28. A method as described in claim 1, wherein said first plurality of geometric rectification quality measure values are associated with a first plurality of geometric rectification quality measures, wherein said first plurality of geometric rectification quality measures comprises at least one measure selected from the group consisting of a measure of a number of vanishing points, a measure of the reliability of a focal length estimate, a measure of the angle between a horizontal vanishing point and a vertical vanishing point, a measure of correction strength, a measure of the overlap between detected corners and a document quadrilateral and a measure of correction angle.

* * * * *